June 1, 1948.  J. R. WILCOX  2,442,523
PLANTER AND PROCESS OF OPERATING THE SAME
Filed June 19, 1941  4 Sheets-Sheet 1
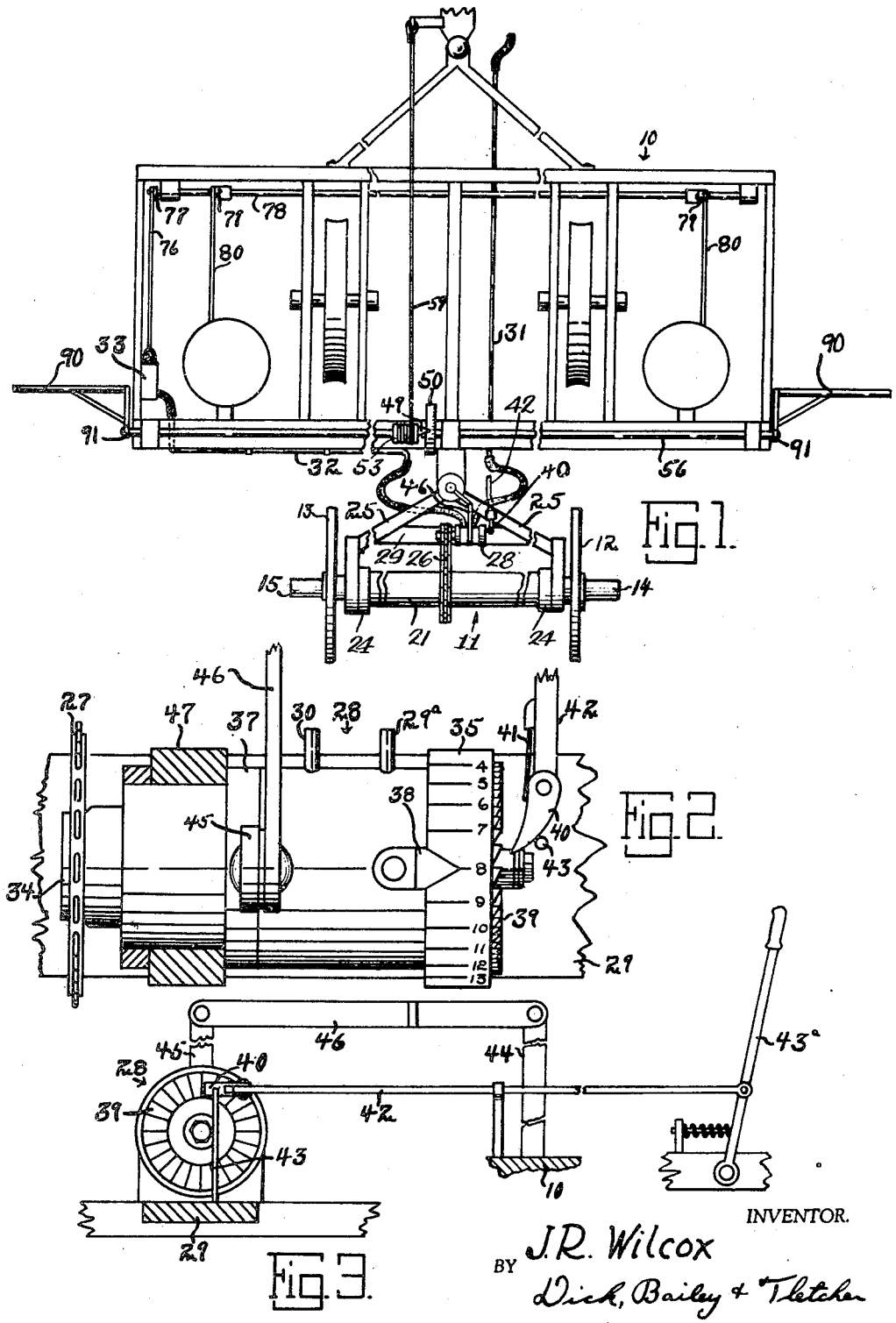
INVENTOR.
BY J. R. Wilcox
Dick, Bailey & Fletcher June 1, 1948. J. R. WILCOX 2,442,523
PLANTER AND PROCESS OF OPERATING THE SAME
Filed June 19, 1941 4 Sheets-Sheet 2

INVENTOR.
J. R. Wilcox
BY Dick, Bailey & Fletcher

June 1, 1948.    J. R. WILCOX    2,442,523
PLANTER AND PROCESS OF OPERATING THE SAME
Filed June 19, 1941    4 Sheets-Sheet 3
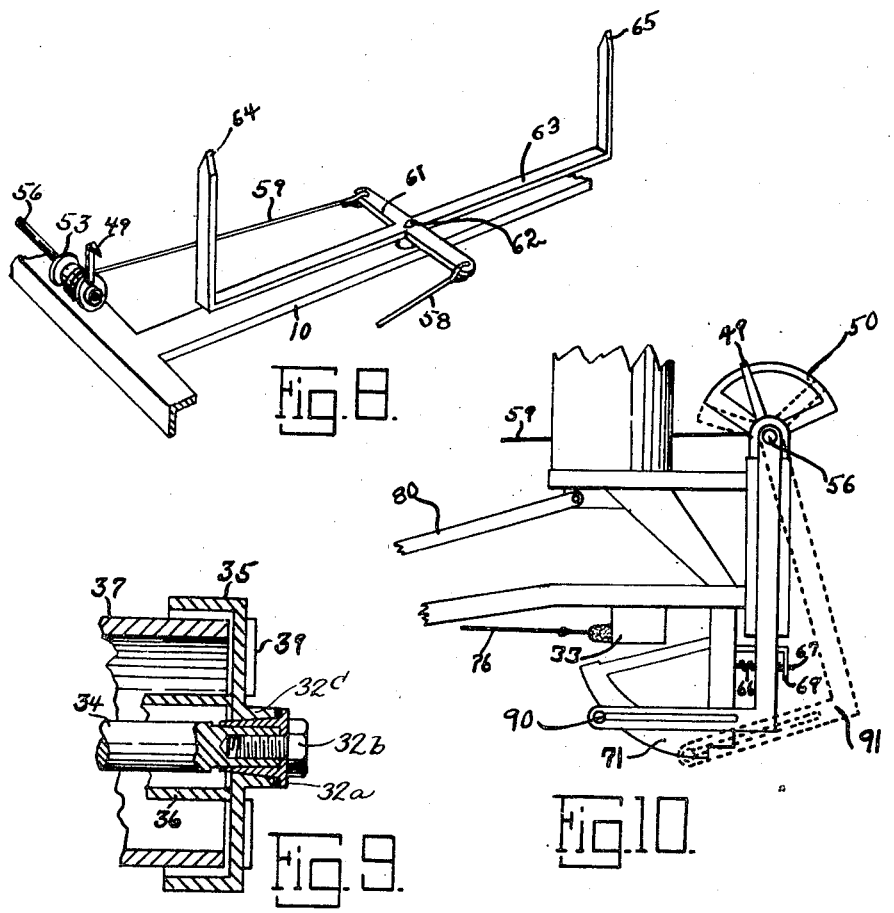
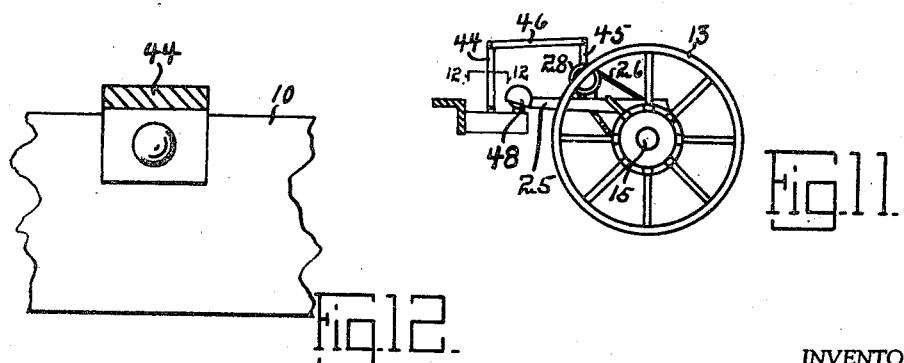
INVENTOR.
J. R. Wilcox
BY Dick, Bailey & Fletcher June 1, 1948. J. R. WILCOX 2,442,523
PLANTER AND PROCESS OF OPERATING THE SAME
Filed June 19, 1941 4 Sheets-Sheet 4
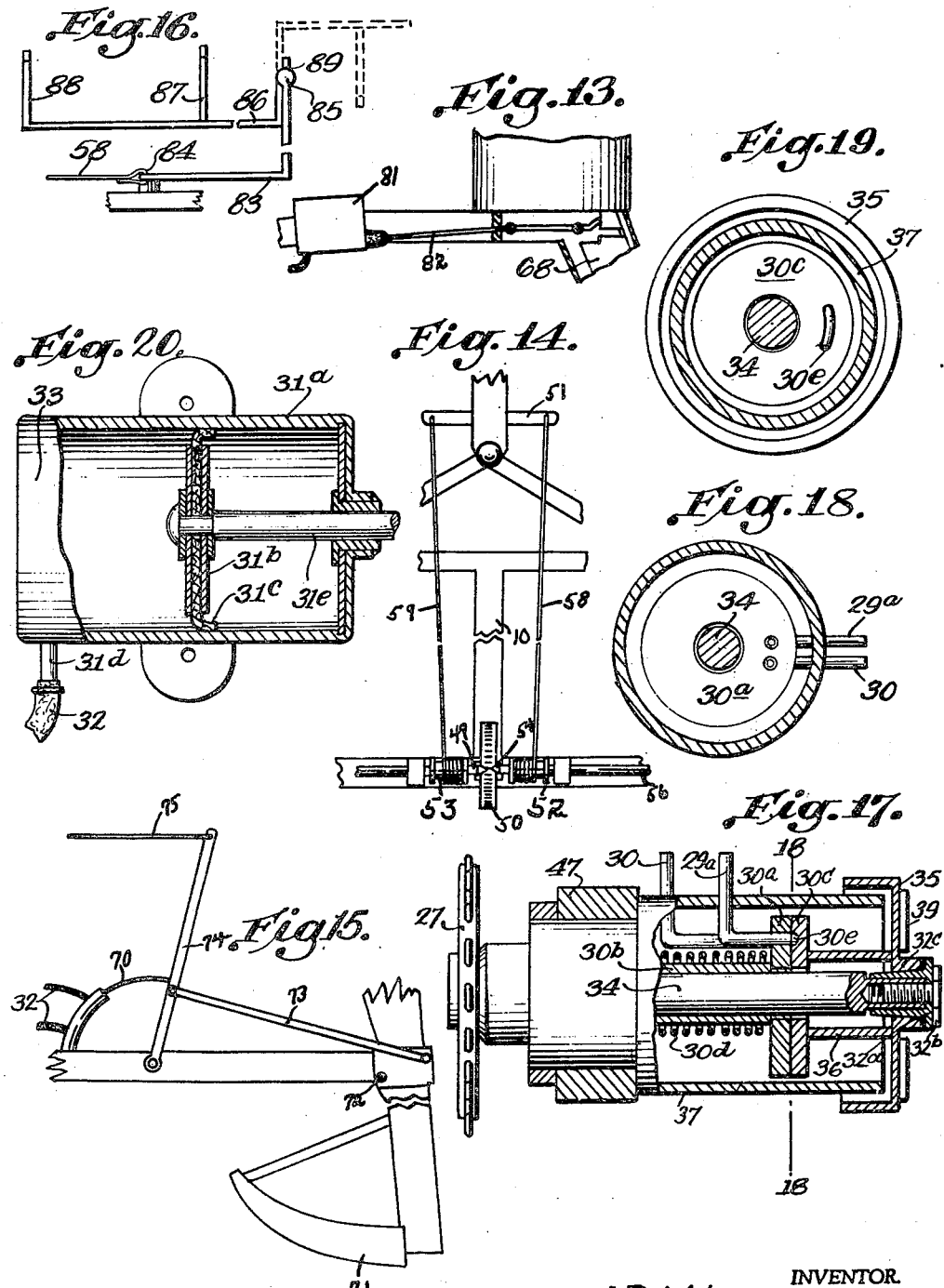
INVENTOR.
J. R. Wilcox
BY Dick, Bailey & Fletcher Patented June 1, 1948

2,442,523

UNITED STATES PATENT OFFICE 2,442,523

PLANTER AND PROCESS OF OPERATING THE SAME

James Russell Wilcox, Jewell, Iowa, assignor of one-half to Clifton A. Furman, Hamilton County, Iowa Application June 19, 1941, Serial No. 398,774

19 Claims. (Cl. 111—16)

This invention relates to seed dispensers. More especially, it relates to planters for corn and other seed planted at spaced intervals.

This invention is related to the invention disclosed in applicant's application, Serial No. 391,726, filed May 3, 1941, and consists in improvements in and modifications of the apparatus there disclosed.

One of the objects of this invention is to provide a novel method for actuating the dropping mechanism of a planter.

Another object of this invention is to provide a planter in which the dropping mechanism is operated at least in part by fluid pressure.

Another object of this invention is to provide a novel operation and control system for planters.

Yet another object of this invention is to provide a novel mechanical control device.

Another object of this invention is to provide means for effecting automatic adjustment for variations caused by vertical displacement of a measuring means.

Another object of this invention is to provide a combination pointer and gauge construction and controls capable of indicating in one reading the algebraic total of vertical alignment with a bumper stick and horizontal alignment between a planter and tractor, or between a planter and field.

Still another object of this invention is to provide means for controlling the vibration of the dropping chamber.

A still further object of this invention is to provide timing mechanism adapted to be mounted to the rear of a tractor and to provide means whereby a person on the tractor may adjust said timing mechanism.

In order that a clear and concise understanding of my invention may be had, reference should be made to the accompanying drawing, forming a part of this specification, in which:

Fig. 1 is a top plan view of a planter and a trailer attachment embodying one form of my invention.

Fig. 2 is a top plan view of a timing device employed in my invention.

Fig. 3 is an end elevation of the timer shown in Fig. 2 together with certain control devices, a portion of the supporting members being shown in cross section.

Fig. 8 is a perspective view of one form of my device for securing compensation for disalignment of the planter with the field.

Fig. 9 is a cross sectional view of a clutch mechanism employed in the timing device shown in Fig. 2.

Fig. 10 is a fragmentary side elevation of the planter.

Fig. 11 is a side elevation of the trailer shown in Fig. 1 and of certain connections.

Fig. 12 is a partially sectional and partially top plan view taken on line 12—12 of Fig. 11.

Fig. 13 is a fragmentary side elevation of my planter showing a modified construction in which individual power devices are employed for operating each individual dropping mechanism. Parts are shown in cross section to more fully reveal the construction.

Fig. 14 is a top plan view of another form of my device for compensating for disalignment between the planter and tractor or field.

Fig. 15 is a fragmentary side elevation of my planter showing a switch which automatically interrupts the power line upon the planter shoes being raised from the ground.

Fig. 16 is a side elevation of an alternative form for a part of the structure shown in Fig. 8.

Figure 17 is a view partially in top plan and partially in longitudinal section of the unit shown in Figure 2 when the latter is constructed in its preferred form.

Figure 18 is a view looking to the left of line 18—18 in Figure 17.

Figure 19 is a view similar to Fig. 18 but looking in the opposite direction from line 18—18.

Figure 20 is a view partially in elevation and partially in longitudinal section showing the preferred internal construction of the unit 33.

Figure 4:
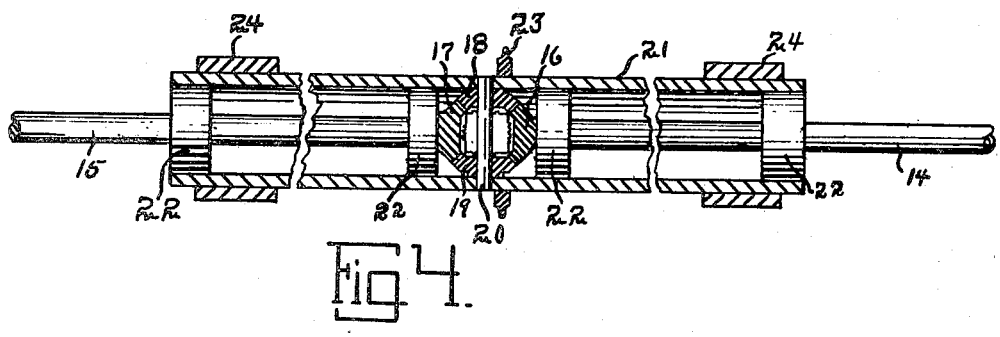
Fig. 4 is a cross sectional view of the axle construction and connected parts of the trailer shown to the rear of the planter in Fig. 1.

In addition to the electrical method for operating the dropping mechanism of a planter disclosed in my pending application, Serial No. 391,726, I have found that I may also employ fluid pressure to accomplish this effect. This fluid method may take form in several different types of embodiments. The preferred form is a vacuumatic arrangement in which outside air pressure actuates the dropping mechanism upon pressure being reduced adjacent one portion of said dropping mechanism or adjacent a portion of a member operatively connected to said dropping mechanism. Another acceptable construction includes means for bringing fluid, either gas or liquid, under pressure into operative engagement with the dropping mechanism or with means operatively connected to said dropping mechanism.

As in my prior application a basic feature of the mechanism involved is a wheel or other suitable device adapted to rotate in non-slipping engagement with the ground, serving with a timer, to measure the intervals at which plantings are to be made and indirectly to actuate the planter dropping mechanism at the proper instants by controlling the application of power thereto from an independent power source.

Referring now to the drawings in greater detail, I have used the numeral 10 to designate the main body of the planter; 11 indicates a trailer device appearing at the rear of the planter 10 in Fig. 1. This trailer 11 having wheels 12 and 13 serves as the measuring device in this modification of my invention. The propelling wheels 12 and 13 are adjustable longitudinally along their respective axles 14 and 15 in order that they may be set to follow in the tracks of variously spaced tractor or planter wheels. These propelling wheels 12 and 13 are so set that they will follow directly in the packed path left by tractor or planter wheels in order that they will rotate in substantially non-slipping engagement with the ground. At the inner ends of the axles 14 and 15 are provided miter gears 16 and 17. Engaging both of the miter gears 16 and 17 are oppositely disposed miter gears 18 and 19. Miter gears 18 and 19 are rotatably mounted upon a shaft or pin 20, the ends of which are mounted in the elongated housing 21. The axles 14 and 15 are rotatably supported by bearings 22, which are mounted in the housing 21. Outside of the housing 21 and locked thereto is the sprocket wheel 23. The housing 21 is rotatably mounted in bearings 24 which are operatively connected to the trailer draw-bars 25. By this construction, when the propelling wheels 12 and 13 are rotating at uniform speeds, the housing 21 also rotates at the same speed, but when, for some cause, one of the propelling wheels is rotating faster than the other, the housing 21 rotates at a speed which is equal to the speed of the slower rotating propelling wheel plus one-half of the difference in speed of rotation of the two propelling wheels. Thus the sprocket wheel 23 continuously rotates at the average speed of the two propelling wheels 12 and 13 taken together. The sprocket wheel 23, or any other suitable means substituted in its place, is operatively connected, in the drawing by the chain 26, to the sprocket wheel 27 of the timer 28 which is shown in the drawing as adapted to control a vacuumatic power system by which is meant a power system producing action by reducing the air pressure on at least one surface of a member being activated. However it may be a timer controlling any suitable power system including various types of fluid pressure and electrical. In Fig. 1 the timer 28 is shown as mounted on the cross bar 29 of the trailer 11. The inlet and outlet ports 29a and 30 respectively of the timer are connected to suitable conduits 31 and 32. As is seen in Figs. 17–19, in the particular timer shown for illustrative purposes, the inlet and outlet port tubes 29a and 30 terminate, at their inner ends in a collar 30a forming a part of the sleeve 30b which is slidably received on the shaft 34. The construction is such that the orifices in the collar 30a in which the lower ends of the tubes 29a and 30 are respectively received extend completely through said collar so that said tubes are actually in communication with that face of said collar or flange 30a which is remote from the one through which said tubes enter said collar or flange. As appears clearly in Fig. 9, at that end of the shaft 34, which is opposite to that on which the sprocket wheel 27 is locked a dial 35 is mounted by means of a conical shaped sleeve 32a held in place on the shaft 34 by a suitable bolt 32b adapted to facilitate regulation of the yieldability of the connection between said dial 35 and said shaft 34, such regulation being accomplished by varying the extent to which said cone 32a is forcibly wedged into the hub 32c of the dial 35 by tightening or loosening of the said attaching bolt 32b. To the dial 35 is connected the sleeve 36 which encircles the shaft 34 and which is provided with a flange or abutment 30c against which the flange 30a is snugly pressed by the spring 30d, said flange 30a being slidable relative the tubes 29a and 30 similarly as the sleeve 30b is slidable relative the shaft 34. On that face of said flange 30c which is adjacent the collar 30a an arc-shaped groove or cut-out 30e is provided at a point such as to at times register with the orifices in the flange 30a with which the tubes 29a and 30 communicate and of a length somewhat greater than the distance between said orifice whereby, as said flange 30c is rotated with dial 35 driven by shaft 34, the orifices in the flange 30a and thence the tubes 29a and 30 are momentarily placed in communication with each other during each revolution of the said flange 30c. Thus it is seen that each time the flange 30c makes a revolution, the vacuum source, to which the tube 29a is connected through conduit 31 is operatively connected for an appreciable time with the vacuum chamber unit 33 which is constantly in communication with the tube 30 through conduit 32 and which is also operatively connected to the planter dropping mechanism. It will be apparent that a complete power system or circuit is thus afforded. Any suitable construction may be employed as the vacuum chamber 33, but for illustrative purposes a satisfactory unit has been illustrated in Fig. 20 and comprises a cylinder 31a, a plunger 31b having leather 31c, a tube 31d adapted to connect one end of said cylinder with the vacuum source and a plunger rod 31e.

The housing of the timer 28 has been designated by the reference character 37. A pointer 38 mounted on the housing 73 serves to indicate the position of rotation of the dial 35. On the outer end of the dial 35, ratchet teeth 39 are provided adapted to engage the pawl 40 which is normally held out of engagement with said ratchet teeth 39 by means of the spring 41. As the bar 42 upon which the pawl 40 is mounted is moved rearwardly by manual force, the broad convex surface of the pawl 40 engages the pin 43 forcing the pawl into engagement with the ratchet teeth 39 whereupon further rearward motion of the bar 42 and pawl 40 causes rotation of the dial 35 relative the shaft 34 the latter being held against rotation, when the planter is not in motion, by the chain 26 operatively connected, as heretofore described, to the wheels 12 and 13 and such relative rotation being permitted by reason of the slip clutch arrangement of fastening the dial 35 to the shaft 34 as illustrated in Fig. 9 and hereinabove described. The adjustment of the slip clutch is such as to positively drive, when the shaft 34 is rotated, the relatively light load of the dial 35 and flange 30c and such, also, as indicated above, as to permit slippage between the dial 35 and shaft 34 when the former is manually rotated, the resistance to the rotation of the shaft 34 being then relatively great. The opposite end of the bar 42 is connected to the lever 43a (Fig. 3) which is mounted within the reach of a person on a tractor in front of the planter. By this construction, it is possible for a person seated upon the tractor to set the scale 35 at the desired point without dismounting from the tractor. Thus it is seen that travelling of the wheels 12 and 13 of the measuring device along the ground drives the timer 28 causing intermittent completion of an independent power circuit, vacuumatic or otherwise, causing actuation of the plunger rod 31e at predetermined intervals. Since, as will be hereinafter set forth in greater detail, the plunger rod 31e is operatively connected to the dropping mechanism of the planter, the drawing of the measuring device 11 across a field causes the dropping of kernels of grain at predetermined intervals. It is further apparent that the operator may, from the seat on the tractor, regulate the point at which the next dropping of kernels will occur by manipulation of the lever 43a which rotates the dial 35 changing the position of the groove 30e with reference to the orifices in the flange 30a with which the tubes 29a and 30 are in communication, thus altering the amount of rotation of the flange 30e necessary to occasion a completion of the power circuit. In order to compensate for arcual travel of the timer housing 37, carrying with it the ports 29a and 30 together with collar 30a, about the pivotal connection 48 which unites trailer 11 to the planter, as the trailer passes over a small mound or through a recession in the field and for its arcual travel about the axles 14 and 15 as the planter passes over a mound or through a recession, I provide a series of pivoted levers which operatively engage the housing 37 of the timer 28. Vertical lever 44 is mounted upon the planter or support other than the trailer 11. The vertical lever 45 is secured to the housing 37 of the timer 28. The horizontal link 46 is pivotally connected to each of the levers 44 and 45 and the housing 37 of the timer 28 is rotatably mounted in the bearing 47. By this construction, arcual displacement of the timer 28 causes the link 46 to rotate upon its pivotal connections, thus changing the horizontal distance between the tops of the two levers 44 and 45, with the result that the lever 45 rotates the housing 37 in the bearing 47. As appears clearly in Fig. 12, the lever 44 is pivotally mounted at its base in order to permit variation in the alignment between the trailer 11 and the planter. As indicated the trailer 11 is connected to the planter by any suitable ball and socket or other connection 48. In setting the timer 28 after turning around at the end of a row, I employ a pointer 49 and gauge 50 to determine the reading at which said timer should be set. A highly satisfactory construction for this gauge and pointer is set forth in detail in my co-pending application, Ser. No. 391,726, filed May 3, 1941, and includes a rotatable shaft 56 bearing the gauge 50 and having depending, adjacent its ends, long arm members 91 (see Figs. 1 and 10) carrying bumper bars 90. When commencing the planting of a new row, or rows, if the planter be a two-row planter, it is desirable that the hills or plantings thereof be in alignment with those previously planted so that the hills are in rows in the field not only in the direction of travel of the planter but also in the direction transverse thereto. For this to be accomplished it is necessary that the first planting of each trip across the field be in exact alignment with the last planting of the trip just completed, and it is to insure such alignment that I employ the pointer 49 and gauge 50 in determining the proper setting for the timer at the commencement of each trip. When a trip is finished the location of the line of the last planting is marked, for example, by a stake inserted into the ground. The proper placement of the stake may be secured by bringing the planter to a halt as soon as possible after the last planting of the trip and swinging the bumper bar 90 rearwardly until the reading on the scale 50 is the same as that on the scale of the timer 28. The stake is then placed immediately in front of the bumper bar and when so placed is in alignment with the last planting for the arrangement is such that the timer 28 plants at the zero mark on its scale, the scale on the gauge is calibrated and set to correspond with that of the timer, and the bumper bars 90 are in alignment with the seed dropping mechanism. When the stake has been placed the planter is turned around and so placed that a bumper bar 90 is in abutment with the stake. If the bumper bar has just contacted the stake the reading on the gauge 50 will be zero, meaning that the seed dropping mechanism is in direct line with the last planting whereupon the timer 28 will be set at zero. If the planter has moved forward somewhat after the bumper bar has come into contact with the stake, the arm 91 will have swung rearwardly somewhat causing a reading other than zero on the gauge 50 meaning that the last planting has been passed by the seed dropping mechanism by the number of inches indicated on the gauge 50. The timer 28 will then be set, for example, by manipulation of the lever 43a to a corresponding reading. The preferred practice is to set the stake at a point in exact alignment with what would have been the last planting had another planting been made after the last one actually made. In this manner it is possible to avoid missing the first planting of a trip which occurs if the stake is set in line with the last planting itself and the planter, when being placed for starting of the new row, is driven forward to an extent such that there is a positive reading on the scale 50. In order that the reading from the gauge 50 may include also any compensation necessary in the horizontal position measurement due to disalignment between the planter and the tractor or field, I have provided a novel equalizing construction.

Figure 6:
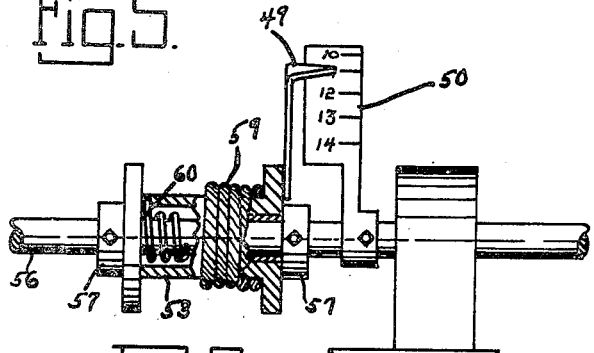
Fig. 6 is an elevational view of a pointer and gauge construction mounted on the planter proper, a portion being broken away to more clearly reveal the construction.

Fig. 14 shows one embodiment of this equalizing device. The cross-bar 51 is rigidly secured to the draw-bar of the tractor. Drums 52 and 53 bearing pointers 49 and 54 are rotatably mounted upon the shaft 56 to which the gauge 50 is locked. As appears clearly in Fig. 6, these drums 52 and 53 are held in longitudinal position on the shaft 56 by means of collars 57. Ropes, cables or other suitable means 58 and 59 connect the cross-bar 51 to the drums 52 and 53 respectively, and the drum ends of said ropes 58 and 59 are wound about their respective drums. A spring 60 is provided, as appears clearly in Fig. 6, tending to rotate the drum in one direction of its rotation. By this arrangement of parts when the planter is not in direct alignment with the tractor, the elongated portions of the cables 58 and 59 will be varied from their normal lengths. Any slackening of one of the cables will be taken up by rotation of the respective drum due to the action of the spring 60 with consequent movement of the respective pointer 49 or 54. Any elongation of one of the cables will cause rotation of the respective drum and pointer in the opposite direction. The construction is such that disalignment between the tractor and the planter to the extent of say two inches causes the proper pointer to make a two inch compensation on the reading on the scale 50. Whether pointer 49 or pointer 54 is read in a given case depends upon the location of the point on the ground relative to which horizontal location is being determined.

Fig. 8 illustrates another embodiment of my equalizing device. The rotating drums, pointers, springs, and cables are substantially the same as in the embodiment shown in Fig. 14. However, the forward ends of the cables are attached to a cross bar 61 pivotally mounted at 62 upon the planter 10. A bar 63 having sights 64 and 65 mounted at each end thereof intersects the cross bar 61 at right angles. When employing this embodiment the operator lines the sights 64 and 65 with the direction of the planted rows and then takes his reading on the gauge 50 similarly to the method employed with the modification shown in Fig. 14. The advantage of the construction shown in Fig. 8 resides in the fact that proper alignment with the field can be secured even if the tractor is not in perfect alignment with the field at the time the reading is being taken.

Figure 7:
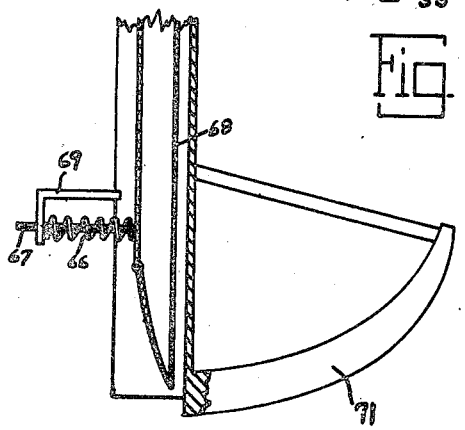
Fig. 7 is a view, partially in side elevation and partially in cross section, showing a dropping chamber and stabilizer therefor together with a planter shoe.

In Fig. 7 I have shown a means for controlling more definitely the placement of the kernels of seed. I have found that as a planter travels over the field at a relatively high speed, the dropping chamber vibrates to such an extent that as the kernels of seed take their exit from the dropping chamber, they are hurled backward a substantial distance due to impact with the seed dropping chamber. This effect is undesirable in that it tends to cause lack of uniformity in the distances between the hills. My stabilizer for the dropping chamber, which finds utility in planters whether or not they are otherwise equipped with my invention, consists of any suitable type of yieldable snubber or shock absorber. In Fig. 7 I have shown an embodiment in position on a standard type dropping chamber the nature of which is entirely immaterial to my invention. It employs a spring 66 threaded on a pin 67 and placed between the dropping chamber 68 and the inverted bracket 69. The dropping chamber end of the pin 67 is preferably secured to the dropping chamber 68 and its other end is longitudinally slidably received in a hole in said inverted bracket 69. Any rearward vibration of the dropping chamber brings said chamber into engagement with the spring 66 which yieldingly halts such rearward motion.

In Fig. 15 I have shown a switch construction 70 and connected members adapted to automatically interrupt the power system or circuit upon the planter shoes 71 being raised from the ground at the end of a row or the like whereby wasting of seed due to functioning of the dropping mechanism while the planter is being turned around is averted. In Fig. 15, the planter shoe 71 and connected structure are shown as pivoted at 72 and adapted to be raised as a result of the action of levers 73 and 74 and pull rod 75. As the lever 74 moves forward raising the planter shoes 71 from the ground, it opens the switch 70 interrupting the power line. The switch 70 may be of any suitable type and its exact construction is not a concern of this invention.

Figure 5:
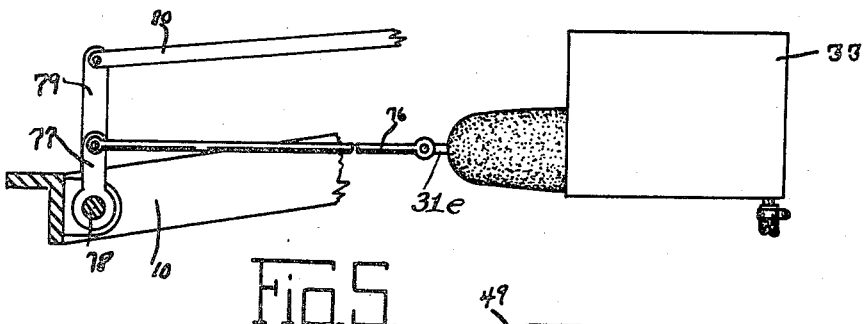
Fig. 5 is a side elevation of the power device and connecting levers which operate the dropping mechanism of my planter.

Fig. 5 represents a fragment of the power system which closely simulates the corresponding fragment of the power system shown specifically in the drawing in my pending application, Serial No. 391,726, except that an electrical unit has been replaced by the vacuum chamber 33 or other suitable mechanism if another type of fluid control be employed. A satisfactory construction for the chamber 33 is illustrated in Figure 20 and has been hereinbefore described. In Fig. 5, the vacuum chamber 33 through the piston 31b and the piston rod 31e (Fig. 20) operates the pull rod 76 which moves the lever 77, causing the elongated shaft 78 to rotate. At intervals along the shaft 78 levers 79 are stationed. From each of the levers 79 a rod 80 extends at least indirectly to an individual dropping mechanism of the planter. Rotation of the shaft 78 causes each of the levers 79 to move, operating through the various rods 80, each of the individual dropping mechanisms. The dropping mechanisms may be of any appropriate type.

In Fig. 13 I have shown an alternative method of operating the individual dropping mechanisms. I here employ a plurality of vacuum chambers or comparable devices 81. Each of the vacuum chambers 81 which may, if desired, simulate in construction the unit 33, operates only one individual dropping mechanism and a vacuum chamber is provided for each dropping mechanism to be operated. The rod 82 operates only one single dropping mechanism.

The construction shown in Fig. 16 is a modified form of the sighting portion and connections shown in Fig. 8. The supporting bracket 83 is pivoted on the planter at 84. The ropes or other suitable members extending to the drums 52 and 53 (Fig. 14) are attached to the bracket 83 or connected structure in any suitable manner. Pivotally mounted at 85 on the bracket 83 is a bracket 86 supporting sights 87 and 88. As shown by the dotted lines, the bracket 86 is adapted to be pivoted to an inverted position extending forwardly of the bracket 83. A stop 89 controls the downward movement of the bracket 86 when in the inverted position. By this construction, a person sitting on the tractor can optionally sight either forwardly or rearwardly by simply altering the pivotal position of the bracket 86. As appears clearly in the drawing, the horizontal portion of the bracket 86 which is adjacent the bracket 83 is sufficiently elevated when the bracket 86 is in its inverted position to clear above the head of the person on the tractor.

In employing my novel planter, the operator upon arriving at the end of a planted row, if his planter is equipped with either the modification shown in Fig. 8 or that shown in Fig. 16, sights rearwardly to determine that the planter and planted rows are in perfect alignment. If they are not, he adjusts the sights so that the sights are in perfect alignment with the field or rows. Then leaving the sights in this aligned position, he dismounts from the tractor and rotates the gauge 50 until the pointers designate a reading on the gauge 50 corresponding to the reading on the dial 35 of the timer 28. This rotation of the gauge may be accomplished by moving one of the bumper bars 90 rearwardly, inasmuch as said bumper bars are at least indirectly connected to the hanger member 91, which in turn is locked to the rotatable shaft 56 on which the gauge 50 is mounted as heretofore set forth. The operator next places a stake in front of one of the bumper bars 90, depending on the direction in which he expects to turn, and forces it into the ground. As will be apparent, the said stake when placed is in alignment with a transverse row of planting or with what would have been a row if the planting had continued. He then raises the planter shoes from the ground at the same time opening the switch 70 and proceeds to turn his tractor and planter around and again places one of the bumper bars 90 in engagement with the stake which he has set. If his planter is equipped with the apparatus shown in Fig. 14 he next simply reads the gauge 50 as designated by the proper pointer 49 or 54, depending upon which bumper bar 90 is in engagement with the stake and proceeds to set the scale 35 on the timer 28 to a corresponding reading by means of manipulation of the lever 43a. If the particular planter is equipped with structure shown in either Fig. 8 or Fig. 16, the operator after turning around and bringing a bumper bar 90 into contact with the said stake, lines the sights 64 and 65 or 87 and 88, as the case may be, with the field. If the apparatus shown in Fig. 16 is employed, the operator may do this without even dismounting from the tractor. With the sights in proper alignment, he proceeds to read the gauge 50 and to set the scale 35 accordingly in substantially the same manner as if he were using the apparatus shown in Fig. 14. The scale 35 set, he is ready to return across the field with assurance that the present planting will line with the previous for with the scale 35 set to the same reading as the gauge 50 which shows the distance the planter is past the stake which is aligned with the transverse rows, the timer to which the dial 35 is connected, will cause the first kernels to fall at the desired distance from the stake, and so on.

The operation of my planter is simple. The wheels 12 and 13 of the measuring device 11 rotating in substantially non-slipping engagement with the ground causes rotation of the housing 21 which in turn, through suitable transmitting means, drives the timer 28. The timer 28 intermittently completes the power circuit causing operation of the dropping mechanism. When the timer is being set by rotation of the dial 35 due to engagement of the pawl 40 with the ratchet 39, the shaft 34 remains stationary; the clutch shown in Fig. 9 or other suitable mechanism substituted in its stead permits the dial 35 to rotate about the shaft 34 when under pressure. Under normal conditions the dial 35 rotates with the shaft 34. The action of the spring 66 or other snubber or shock absorber is to steady the dropping chamber and to minimize its vibration with the result that the chamber does not throw the seed kernels rearwardly to any substantial extent.

In this specification and claims the term "timer" has been employed to designate any device adapted to intermittently completing a power circuit or system. "Dropping chamber" is intended to include any structure which the seed kernels touch immediately before leaving the planter completely.

While I have shown a fluid power system in the present application for illustrative purposes, it is clear that many of the devices shown operating in conjunction therewith may be employed in connection with planters using other types of power systems for actuating the dropping mechanism and/or employing other types of measuring devices. Obviously they may be employed in the electrical type planters disclosed in my pending application, Serial No. 391,726. For example, the trailer type measuring device herein disclosed may be substituted for the propelling wheel (denominated a "measuring wheel" in my co-pending application) disclosed in my pending application and the device herein disclosed for compensating for vertical displacement of the trailer may be employed whether or not the trailer is used. If the trailer is not used, a device of the same general construction may be employed to compensate for arcual displacement of the timer used with a single propelling wheel. Obviously the structure shown, including the clutch and timer structure, for enabling a person on the tractor to set the timer on the trailer may be employed whether or not the timer is electrical. Again any of the equalizing devices here illustrated for securing an algebraic total of horizontal distance and alignment between the planter and the field may be employed in the electrical type apparatus. The dropping chamber stabilizer also may be employed in other types of planters. Individual power units for operating each individual dropping mechanism may be provided whether they be vacuumatic, electrical or otherwise. An automatic cut-off switch interrupting the power line when the planter shoes are raised from the ground may obviously be employed regardless of the type of power system.

My invention may be employed in either trailer type planters such as the one shown herein for illustrative purposes or in a planter mounted directly upon a tractor.

My invention is not limited to particular power systems but includes the basic principle of employing a very lightly loaded measuring device and operating the dropping mechanism of the planter in the main by power derived from a source other than the measuring device. In other words, my invention involves the principle of taking only an insubstantial amount of power from the measuring device. By this arrangement, slippage and inaccuracy in the measuring device is minimized, for there is no substantial amount of drag on the measuring device.

It may be desirable under certain circumstances to vary the diameter of the sprocket wheel 27 or its equivalent on the timer 28. Any suitable means for averaging the speed of the two propelling wheels may be subsituted in the trailer 11 for the structure shown in Fig. 4. The relationship of the timer to the measuring device may be changed and any suitable type of measuring device may be substituted for the one shown herein. I have found that on wheel-type measuring devices, it is frequently desirable to use different types of wheels depending upon the condition of the ground, in order to substantially eliminate slippage between the wheels and the field. The various devices which I have disclosed for compensating for disalignment between the planter and the field or tractor may be displaced by any suitable type of device or they may be eliminated entirely. In the particular devices disclosed, the rope members may be replaced by rods or other means and the connections between the rods and the pointers varied to adapt the pointers to be operated by the rods.

The drums and springs may be replaced by other suitable devices or completely eliminated. Gauges may replace the pointers and a pointer the gauge. Any suitable sighting arrangement may be employed and the cross bar may be replaced by a suitable member or eliminated and the ropes or rods connected directly to the sighting structure. The timer may be any device suited to intermittently making or completing a power circuit and the particular timer shown herein may be varied by, for example, modifying or eliminating the sleeve 36, altering the placement of the ports 29a and 30 and varying the dial and its mounting. Any suitable means may be substituted for the pawl-ratchet-clutch structure shown for setting the timer or this combination may be omitted and the operator set the timer directly. The clutch may be omitted and the measuring device caused to rotate in the setting process. A friction device may replace the pawl and ratchet and other suitable structure may be substituted for the clutch. The relationship of the ratchet to the dial may also be varied. The structure for operating the pawl 40 may be materially altered.

In the device which I have shown for compensating for vertical displacement of the measuring means variation in the length of the lever 45 will permit regulation of the amount of compensation obtained. Obviously any suitable compensating device may be substituted for the one which I have shown and the particular device which I have disclosed may be substantially modified. The automatic switch construction shown in Fig. 15 and adapted to cut off the power circuit when the planter shoes are removed from the ground may be of any suitable type or may be omitted.

In addition to being adapted to planters, my invention has application in intermittently dispensing devices of other types.

While I have described an embodiment of my invention and certain modification thereof for illustrative purposes, it is obvious that one skilled in the art will be able to make numerous variations and modifications therein and this without departing from the spirit and scope of my invention. Such alterations may be made not only in component units but also by sustitutions and/or omissions in the overall combination. I therefore wish to be limited herein only by the appended claims.

I claim:

1. In a seed dispenser including load bearing wheels and seed dropping mechanism, an independently powered power system connected to said seed dropping mechanism for intermittently actuating said dropping mechanism, a free running timer connected into said power system for controlling said power system, and a wheel other than a load wheel of said seed dispenser connected to said timer, adapted to rotate in contact with a field and to propel said timer, said wheel having a substantially smooth outer periphery.

2. In a timer for a planter, a rotatable shaft, a member of a scale and pointer assembly provided with a hub loosely received about said shaft and a sleeve of general frustro-conical shape disposed between said hub and said shaft for regulating the yieldability of the connection between said shaft and said hub according to the extent to which it is inserted between them.

3. Construction similar to that described in claim 2 in which pawl and ratchet means are provided for regulating the position of rotation of the hub on the shaft.

4. For a planter including a timer and a propelling wheel, a device for compensating for error in said timer due to arcual travel thereof comprising, a rotatably mounted housing section constituting at least a portion of the housing of said timer, an independently mounted support, and an element pivotally connected, at least indirectly, to said housing section adjacent one of its ends and similarly connected to said support adjacent the other of its ends.

5. For use with a planter a control assembly comprising, a propelling wheel, a timer mounted at least indirectly on said propelling wheel, a pivoted connection for attaching said propelling wheel to said planter in trailing relationship thereto, driving connection between said propelling wheel and said timer to drive the latter, adjustment for regulating the time at which said timer operates, an upstanding member pivotally mounted upon said planter, and a link pivotally connected adjacent one of its ends to the said upstanding member and pivotally connected, at least indirectly, adjacent the other of its ends to said timer adjustment, whereby arcual travel of said timer due to the planter and propelling wheel respectively traveling over mounds and through recessions as they proceed across a field is automatically compensated for.

6. For use with a planter a control assembly comprising, a propelling wheel, a timer mounted at least indirectly on said propelling wheel, a pivoted connection for attaching said propelling wheel to said planter in trailing relationship thereto, driving connection between said propelling wheel and said timer to drive the latter, a plurality of adjustments for regulating the time at which said timer operates, a manual control operating one of said timer adjustments, a member pivotally mounted on said planter, and a link pivotally connected adjacent one of its ends to said latter member and pivotally connected, at least indirectly adjacent the other of its ends, to the other of said timer adjustments whereby arcual travel of said timer due to the planter and propelling wheel respectively traveling over mounds and through depressions as they proceed across a field is automatically compensated for.

7. For use in a planter having seed dropping mechanism, the combination comprising, a power system operatively connected to said seed dropping mechanism to intermittently actuate the same, a propelling wheel for traveling over a field, a timer driven by said propelling wheel and connected into said power system whereby said power system is caused to actuate said seed dropping mechanism at times such that seed is planted in the field at appropriate locations as determined by the propelling wheel-timer assembly, a compensator operatively connected to the timer to automatically offset error in the timer due to arcual displacement of said timer and a measure connectable to said planter for determining the horizontal position of said planter with reference to a point of known position, enabling appropriate adjustment of the setting of the said timer at the commencement of each row.

8. For use in a planter having seed dropping mechanism, the combination comprising, a power system operatively connected to said seed dropping mechanism to intermittently actuate the same, a propelling wheel for traveling over a field, a timer driven by said propelling wheel and connected into said power system whereby said power system is caused to actuate said seed dropping mechanism at times such that seed is planted in the field at appropriate locations as determined by the propelling wheel-timer assembly, and a measure connectable to said planter for determining the horizontal positon of said planter with reference to a point of known position, enabling appropriate adjustment of the setting of the said timer at the commencement of each row.

9. For use in a planter having seed dropping mechanism, the combination comprising, a propelling wheel other than a load wheel of said planter for traveling over a field said wheel having a substantially smooth outer periphery, a power system deriving its energy from a source other than said propelling wheel operatively connected to said seed dropping mechanism to intermittently actuate the same, and a free running timer driven by said propelling wheel and connected into said power system whereby said power system is caused to actuate said seed dropping mechanism at times such that seed is planted in the field at appropriate locations as determined by the propelling wheel-timer assembly.

10. For use in a planter having seed dropping mechanism, the combination comprising, a fluid pressure system operatively connected to said seed dropping mechanism to intermittently actuate the same, a propelling wheel other than a load wheel of said planter for traveling over a field, and a timer driven by said propelling wheel and connected into said fluid pressure system whereby said fluid pressure system is caused to actuate said seed dropping mechanism at times such that seed is planted in the field at appropriate locations as determined by the propelling wheel-timer assembly.

11. In a planter having raisable planter shoes together with seed dropping mechanism, a propelling device, a timer driven by said propelling device, a power system controlled by said timer and adapted to actuate said seed dropping mechanism, a measure for determining the horizontal position of the planter, enabling appropriate adjustment of said timer, a compensator operatively connected to the timer for compensating for error in said timer due to arcual displacement thereof, and a breaker for interrupting the power system when the planter shoes are raised.

12. In a planter having raisable planter shoes and a seed dropping chamber, a propelling device, an adjustable timer driven by said propelling device, a power system controlled by said timer, a measure for determining the horizontal position of the planter, enabling appropriate adjustment of said timer, a compensator operatively connected to the timer for compensating for error in said timer due to arcual displacement thereof, a breaker for interrupting the power system when the planter shoes are raised, and a stabilizer for yieldably stabilizing the dropping chamber whereby accuracy in placement of the kernels is enhanced.

13. In a planter, a propelling device, a timer driven by said propelling device, a power system controlled by said timer, and a measure for determining the horizontal position of the planter, enabling appropriate adjustment of said timer.

14. In a planter, a propelling device, a timer driven by said propelling device, a power system controlled by said timer, a measure for determining the horizontal position of the planter, enabling appropriate adjustment of said timer, and a compensator operatively connected to the timer for compensating for error in said timer due to arcual displacement thereof.

15. In a seed dispenser having seed dropping mechanism, a wheel unit other than a load wheel of said dispenser adapted to rotate in contact with a field, a power system deriving its energy from a source other than said wheel unit for intermittently actuating said seed dropping mechanism, and a timer operated by said wheel unit and controlling said power system.

16. In a seed dispenser having seed dropping mechanism, a fluid pressure system connected to said seed dropping mechanism for effecting intermittent actuation of said seed dropping mechanism, a timer connected into said fluid pressure system for controlling said fluid pressure system, and a wheel other than a load wheel of said seed dispenser adapted to rotate in contact with a field and connected to said timer to operate the same.

17. In combination in a planter, seed dropping mechanism of the type in which the seed is supported from beneath on a movable solid member immediately before being dropped, a fluid pressure system connected to said seed dropping mechanism for effecting intermittent actuation of said seed dropping mechanism, and a timer connected into said fluid pressure system for controlling the pressure exerted upon said seed dropping mechanism by said fluid pressure system.

18. For use in a planter having seed dropping mechanism, the combination comprising, a power system operatively connected to said seed dropping mechanism to intermittently actuate the same, a propelling wheel for traveling over a field, a timer driven by said propelling wheel and connected into said power system whereby said power system is caused to actuate said seed dropping mechanism at times such that seed is planted in the field at appropriate locations as determined by the propelling wheel-timer assembly, and a compensator operatively connected to the timer to automatically offset error in the timer due to arcual displacement of said timer.

19. For use with a planter having seed dropping mechanism, the combination of a timer having relatively movable parts and being operatively connected to said seed dropping mechanism to control the functioning thereof, a vehicle mounting said timer, a second vehicle pivotally connected to first said vehicle, and a connection between said second vehicle and one of said relatively movable parts of said timer for holding in approximately top position, when one of said vehicles is on an irregular parcel of ground that portion of said latter relatively movable timer part which is in top position when said vehicles are standing on ground of the same level, thus automatically limiting error in said timer due to arcual displacement thereof by substantially preventing rotation of said latter relatively movable timer part with reference to the other said relatively movable timer part upon arcual displacement of said timer due to irregular ground.

JAMES RUSSELL WILCOX.

REFERENCES CITED

The following references are of record in the file of this patent:

UNITED STATES PATENTS

| Number | Name | Date |
|---|---|---|
| 196,291 | Ewart | Oct. 23, 1877 |
| 277,031 | Haworth | May 8, 1883 |
| 651,439 | Holden | June 12, 1900 |

(Other references on following page)